(12) United States Patent
Yin et al.

(10) Patent No.: US 12,435,504 B2
(45) Date of Patent: Oct. 7, 2025

(54) PREFABRICATED SEISMIC ISOLATION FIREPROOF AND ACTIVE SELF-CLEANING BEARING SYSTEM AND IMPLEMENTATION METHOD THEREOF

(71) Applicant: TIANJIN FIRE SCIENCE AND TECHNOLOGY RESEARCH INSTITUTE OF MEM, Tianjin (CN)

(72) Inventors: Liang Yin, Tianjin (CN); Bo Song, Tianjin (CN); Jiyang Liu, Tianjin (CN); Guohui Li, Tianjin (CN)

(73) Assignee: TIANJIN FIRE SCIENCE AND TECHNOLOGY RESEARCH INSTITUTE OF MEM, Tianjin (CN)

( * ) Notice: Subject to any disclaimer, the term of this patent is extended or adjusted under 35 U.S.C. 154(b) by 0 days.

(21) Appl. No.: 18/846,652

(22) PCT Filed: Feb. 20, 2024

(86) PCT No.: PCT/CN2024/077701
§ 371 (c)(1),
(2) Date: Sep. 12, 2024

(87) PCT Pub. No.: WO2024/174983
PCT Pub. Date: Aug. 29, 2024

(65) Prior Publication Data
US 2025/0257561 A1    Aug. 14, 2025

(30) Foreign Application Priority Data
Feb. 22, 2023 (CN) .......................... 202310152177.2

(51) Int. Cl.
*E04B 1/36* (2006.01)
*E04B 1/94* (2006.01)
*E04B 1/98* (2006.01)

(52) U.S. Cl.
CPC ................ *E04B 1/36* (2013.01); *E04B 1/945* (2013.01); *E04B 1/98* (2013.01); *E04B 2001/949* (2013.01)

(58) Field of Classification Search
CPC ... E04B 1/36; E04B 1/945; E04B 1/98; E04B 2001/949
See application file for complete search history.

(56) References Cited

FOREIGN PATENT DOCUMENTS

| CN | 102146657 A | * | 8/2011 |
| CN | 104314193 A | * | 1/2015 |
| CN | 205875439 U | * | 1/2017 |

(Continued)

*Primary Examiner* — Rodney Mintz

(57) ABSTRACT

A prefabricated seismic isolation fire-proof and active self-cleaning bearing system and an implementation method thereof are provided. When a fire is detected, switching a switching valve to a selected branch, and starting a water supply pump and a drainage pump; passing the water from a water reservoir through a switching valve, a water inlet elbow, a water inlet hose, and a plurality of water spray coils and ejecting the water from all conical nozzles in sequence; transporting the water settled in the water receiving tank to the water reservoir by the drainage pump; when the fire is extinguished, starting the air supply pump and the turning off the water supply pump at the same time, and switching the switching valve to a different branch; ejecting air from several conical nozzles at the same time by the air supply pump through the switching valve.

5 Claims, 5 Drawing Sheets

(56) References Cited

FOREIGN PATENT DOCUMENTS

| | | | | | |
|---|---|---|---|---|---|
| CN | 109537755 | A | * | 3/2019 | ........... C09D 133/04 |
| CN | 209529946 | U | | 10/2019 | |
| CN | 211257939 | U | * | 8/2020 | |
| CN | 111809740 | A | * | 10/2020 | ............. E04B 1/945 |
| CN | 113207792 | A | * | 8/2021 | .............. C02F 1/001 |
| CN | 214006002 | U | | 8/2021 | |
| CN | 215166727 | U | * | 12/2021 | |
| CN | 114876071 | A | | 8/2022 | |
| CN | 217150612 | U | * | 8/2022 | |
| CN | 115031162 | A | | 9/2022 | |
| CN | 115364603 | A | * | 11/2022 | ........... F16F 15/046 |
| CN | 116427555 | A | | 7/2023 | |
| JP | H09302621 | A | * | 11/1997 | |
| JP | H10299285 | A | * | 11/1998 | |
| JP | 200173586 | A | | 3/2001 | |
| JP | 2017189760 | A | * | 10/2017 | |
| KR | 101515213 | B1 | * | 4/2015 | ........... E04D 13/106 |

* cited by examiner

PREFABRICATED SEISMIC ISOLATION FIREPROOF AND ACTIVE SELF-CLEANING BEARING SYSTEM AND IMPLEMENTATION METHOD THEREOF

BACKGROUND OF THE PRESENT INVENTION

Field of Invention

The present invention relates to the technical field of fire prevention and daily maintenance of building construction elements, and more particularly to a prefabricated seismic isolation fire-proof and active self-cleaning bearing system and an implementation method thereof.

Description of Related Arts

Seismic isolation bearings, represented by seismic isolation rubber bearings, are designed according to the seismic performance requirements of buildings, constructions and equipment. The Seismic isolation bearings are capable of withstanding seismic effects within a certain limit during their entire service life, but they are also threatened by earthquake disasters, fire accidents, daily rain and snow, and wind and sand erosion. The rubber body, which is the core component of the seismic isolation rubber bearing, is made of steel plates and vulcanized rubber stacked in sequence. Horizontal displacement occurs under the action of an earthquake, and the deformation may be large, reaching the height of the bearings. In addition, the softening temperature of rubber materials is low, and they are very easy to be destroyed after being exposed to fire, which poses fire threats to the upper structure and the bearings. Therefore, the fire threaten types of seismic isolation bearings faced include general scene fires and secondary fires after earthquakes.

Most of the conventional arts that can be searched adopts the method of coating the fireproof protective material such as flexible felt, hard block, etc. around the rubber body, see Chinese patents with application numbers of CN201710254966.1, CN202110502543.3, CN202110442670.9, CN202210347695.5, CN202011471929.4, CN202110425328.8, CN202021564748.1, and CN202222640078.2, etc. Some of the Chinese patents ignore the possibility of post-earthquake secondary fires or consider the possibility thereof being small, and consider post-earthquake repair of fire protection damage during the earthquake; some of the patents are committed to proposing fire protection structures that can adapt to the horizontal displacement of the rubber body during an earthquake, for instance, moving upper part, fixing the lower part; dividing the fire protection facade into multiple layers; adopting stacked flexible cotton to buffer the displacement and stretching, etc. Obviously, most of the conventional arts are conceptual designs, and their engineering application reliability and durability are insufficient. The higher the bearing height (above 1.0 m), the worse the reliability.

Meanwhile, there are very few technical reports on the application of water cooling protection technology to such seismic isolation bearings. Most of the technical reports are based on storage tank. For example, the exterior facade of the storage tank is equipped with a sprinkler ring pipe, with extremely large droplet size and water requirement in Chinese patent with application numbers of CN201410626842.8 and CN202022433199.0. A few of the technical reports are based on building components made of metal, such as in the Chinese patent with an application number of CN202020567805.5.

In particular, a Chinese patent with an application number of CN202210502868.6 is aimed at the requirements for fire protection in seismic isolation rubber bearings for supporting LNG (Liquefied Natural Gas) storage tanks, and proposes a structure in which an annular spray pipe is connected to the bottom or side of the upper connecting plate of the seismic isolation rubber bearings. When there is sufficient water, the annular water curtain formed thereon can prevent the flame from extending to the rubber layer of the seismic isolation bearings, thereby achieving heat insulation. However, it is apparently that the concentration of water nozzles on the upper part of the rubber body may lead to a height temperature gradient in the rubber body in an encircling fire scenario, and even damage the rubber material due to water loss in the lower part of the isolation bearing due to evaporation; furthermore if the isolation bearing is not completely reset during an earthquake, the surface temperature of the rubber body will become more non-uniform during a secondary fire; and the large amount of water consumption increases the system load, reduces the reliability of the long-term insulation effect (e.g. 6.0 h), and is also a damage to the rescue site.

Acidic and alkaline harmful substances in rain, snow, and seawater will corrode the rubber body. In view of the anti-corrosion problem of the rubber body, screw connection, and the contacting surface of the connecting plate, the conventional art proposes some passive protection measures, for instance, in a Chinese patent with an application number of CN202222621669.5, a rubber protective outer ring is added to the outer surface of the rubber body; in a Chinese patent with an application number of CN201720852018.3, expanded fireproof blocks are adopted to protect screws; and in a Chinese patent with an application number of CN201420398639.5 a waterproof sealing strip is added between the connecting plate and the bearing body. It can be seen that these conventional technologies are all passively subjected to uncertain corrosion factors, and fail to defend and remove these harmful factors through active maintenance measures. At the same time, the problem of sand and wind etching the rubber body surface has not received technical attention, and the problem of long-term service coating protection durability degradation leading to acid and alkali harmful moisture condensing on the rubber body surface has not received technical attention.

SUMMARY OF THE PRESENT INVENTION

In view of the above deficiencies in the conventional arts, the present invention provides a prefabricated fireproof and active self-cleaning seismic isolation bearing system and an implementation method thereof.

In the conventional inorganic material coated protection seismic isolation rubber bearings such as plates and cotton felt, the deformation adaptation reliability and service durability are poor, and rainwater and snow water containing acid and alkali, and moisture penetration erosion are only passively defended, without active maintenance and removal. The problem of sand and wind etching the rubber body surface has not received technical attention. The water cooling protection technology is applied to such components after fire/earthquake, but the fire protection effectiveness and reliability are insufficient.

The present invention is capable of realizing an integrated active protection, cleaning and maintenance on fire, post-earthquake fire, rain and snow water corrosion, wind and sand etching, etc. The present invention is capable of providing protection based on performance targets, capable of being conveniently assembled on site, and is suitable for both new construction and conventional reconstruction. It is also particularly suitable for seismic isolation bearings with high height and large horizontal deformation, which is equal to or greater than the bearing height, during earthquakes.

The buildings, constructions, and equipment of storage tanks and containers using the technical solution of the present invention will greatly improve the safety under fire and post-earthquake fire, improve the overall long-term service life, and achieve water resource conservation to the greatest extent. In particular, the application in offshore areas and offshore structures will further show considerable economic benefits, so as to increase the inherent safety of fire protection of the buildings, the constructions and the equipment, and long-term service reliability. And the present invention is conducive to reducing the collapse damage under fire and the direct and indirect costs of daily maintenance.

The technical solutions adopted by the present invention are as follows.

A prefabricated fireproof and active self-cleaning isolation bearing system, comprising: an upper structure, a lower structure, and a rubber body;

and further comprising: a functional body and a circulation equipment, wherein the functional body comprises a water receiving tank formed by fixing a rectangular frame on a bearing lower plate, wherein the bearing lower plate is mounted on the lower structure, wherein a water outlet elbow is provided on the lower structure, and the water outlet elbow is connected to the water receiving tank;

wherein a bearing upper plate is mounted under the upper structure, a water inlet elbow is provided on the upper structure, and the water inlet elbow is connected to the bearing upper plate;

a rubber body is provided between the bearing lower plate and the bearing upper plates, a plurality of water spray coils are fixed at intervals outside the rubber body, and a conical nozzle is connected on each short pipe of each of the plurality of water spray coils;

a water inlet hose is connected to the plurality of water spray coils through a plurality of water diversion ports;

the water inlet elbow is connected to the plurality of water spray coils through the water inlet hose;

the circulation equipment comprises a drainage pump, a water tower, a water reservoir, a filter screen, a water supply pump and a B2 end of a switching valve which are connected in sequence; wherein an air supply pump is connected with a B1 end of the switching valve, an A end of the switching valve is connected to an outer end of the water inlet elbow of the functional body, and an water inlet end of the drainage pump is connected to an outer end of the water outlet elbow on the functional body.

A method for implementing the prefabricated fireproof and active self-cleaning isolation bearing system is further provided, wherein steps of a functional body protection process under fire comprises:

S1: when a fire is detected, automatically or manually switching a switching valve to a B2 branch, and starting the water supply pump and the drainage pump simultaneously, filtering water by the water reservoir through the filter screen, and then passing through the B2 branch of the switching valve, the water inlet elbow, the water inlet hose, and the plurality of water diversion ports to supply water to the plurality of water spray coils simultaneously, all the conical nozzles of the plurality of water spray coils spray water at the same time, in such a manner that a space formed by a vertical surface of the rubber body, the bearing upper plate and the water receiving tank are all covered by water;

transporting water settled in the water receiving tank to the water tower via the water outlet elbow by the drainage pump for cooling and then returning to the water reservoir;

S4: during the process, monitoring and adjusting an opening degree of the switching valve to stabilize a pressure at a range of 0.25-1.00 MPa, so as to keep a space temperature within a range of 100-110° C.;

S5: when the fire is extinguished, continuing to spray water for 30 minutes, then starting the air supply pump and turning off the water supply pump and switching the switch valve from branch B2 to branch B1, adjusting the opening degree of the switch valve to stabilize the pressure at a range of 0.10-0.30 MPa; supplying air by the air supply pump to the plurality of water spray coils through the switching valve B1 branch, the water inlet elbow, the water inlet hose, and the plurality of water distribution ports in sequence, and spraying gas by the plurality of conical nozzles simultaneously, in such a manner that a facade of the rubber body and the space formed by the facade of the rubber body, the bearing upper plate and the water receiving tank are completely filled with fresh air under a room temperature;

S6: after a temperature of the space outside the functional body drops to a room temperature, all the pipes of the functional body, the facade of the rubber body, the water receiving tank, the space between the upper structure and the lower structure are dried and free of water, turning off the air supply pump and the drainage pump; at this moment, the protection process for the seismic isolation bearing under the fire is completed.

The beneficial effects of the present invention are as follows: the integrated prefabricated assembled seismic isolation bearing system with both fireproof and active self-cleaning functions of the present invention has the characteristics of high effectiveness and reliability in preventing fire and post-earthquake fire, taking into account both fire and daily active maintenance, changing passive protection and maintenance into positive protection and maintenance, being technically feasible and in line with current engineering needs and technological development trends, being oriented towards new construction and renovation of conventional buildings, structures and equipment of many types, saving water resources and thus having wide regional applicability, and realizing convenient prefabrication and assembly of protective equipment for high-height bearings with large horizontal deformation under earthquakes.

The multi-layer spray coils provided meets the full-height fire protection and daily maintenance requirements of high-height seismic isolation bearings, so that the vertical surface of the rubber body is evenly covered with cooling water, avoiding damage to the lower rubber material caused by temperature gradient in the height direction. It is particularly suitable for situations where the rubber body is completely reset after an earthquake or there is a small offset in the height direction.

The connections of the extended steel plate reinforcements and the insulation sleeve with a circular steel plate changes the traditional seismic isolation rubber bearing structure, so that the single-layer spray coils and the rubber body plane of the layer can move back and forth and reset synchronously under the action of an earthquake, without damaging the sprinkler coil, which is an active fire protection equipment.

The water inlet hose meets the requirement of adapting to the stretching amount between the sprinkler coils of different layers of the seismic isolation bearing under earthquakes, avoiding the adjacent layers of sprinkler coils pulling each other, causing the fire protection equipment of the rubber body to be damaged under earthquakes.

The thermal insulation sleeve prevents the formation of a "thermal bridge" between the pipe fixing reinforcements and the steel plate reinforcements, which damages the local rubber of the four-hole rubber ring pads.

The rectangular frame of the water receiving tank allows water resources to be recycled, reducing the water load for long-term cooling, improving the reliability of the entire fire protection facility system, and avoiding the destruction of site rescue conditions by flooding.

The short pipe and conical nozzle of the water spray coil ensure that the rubber body is fully covered in the horizontal plane with as few nozzles as possible, thereby improving the efficiency of water resource utilization.

The present invention further consolidates the inherent safety of seismic isolation bearing fire and post-earthquake fire prevention and control, and the inherent safety of durability against rain, snow corrosion, wind and sand etching, while solving the environmental protection needs of recycling and energy saving and recycling the huge amount of water consumed in fire fighting. The system only utilizes a relatively low water/gas pressure to achieve effective protection and realizes full energy saving, which has huge social public safety and economic benefits as a whole.

DETAILED DESCRIPTION OF THE PREFERRED EMBODIMENT

Figure 1:
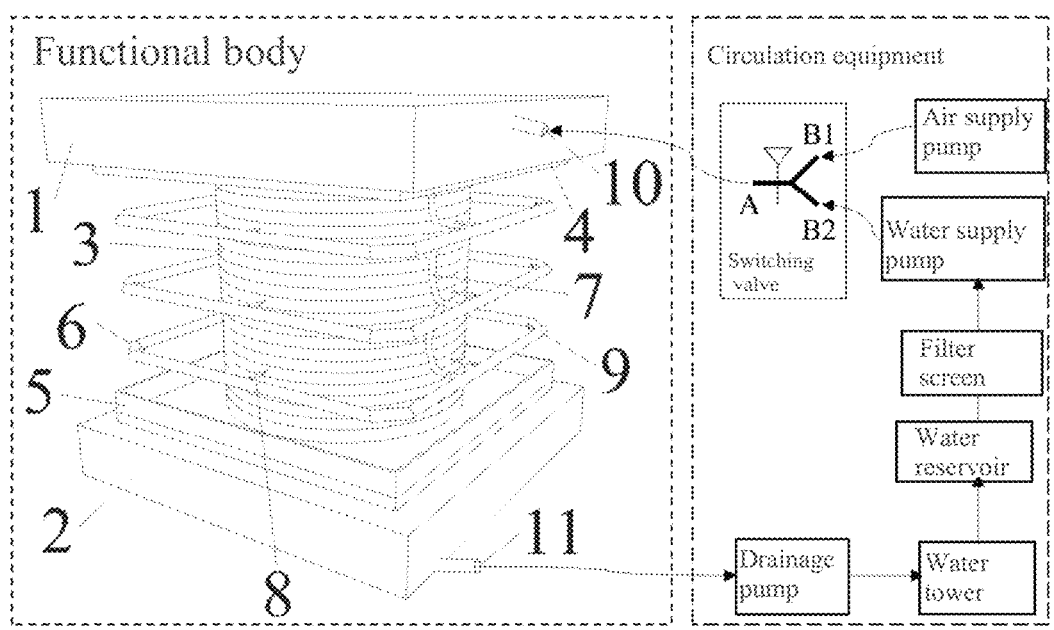
FIG. 1 is a schematic diagram of an overall structure according to a preferred embodiment of the present invention.
Figure 2:
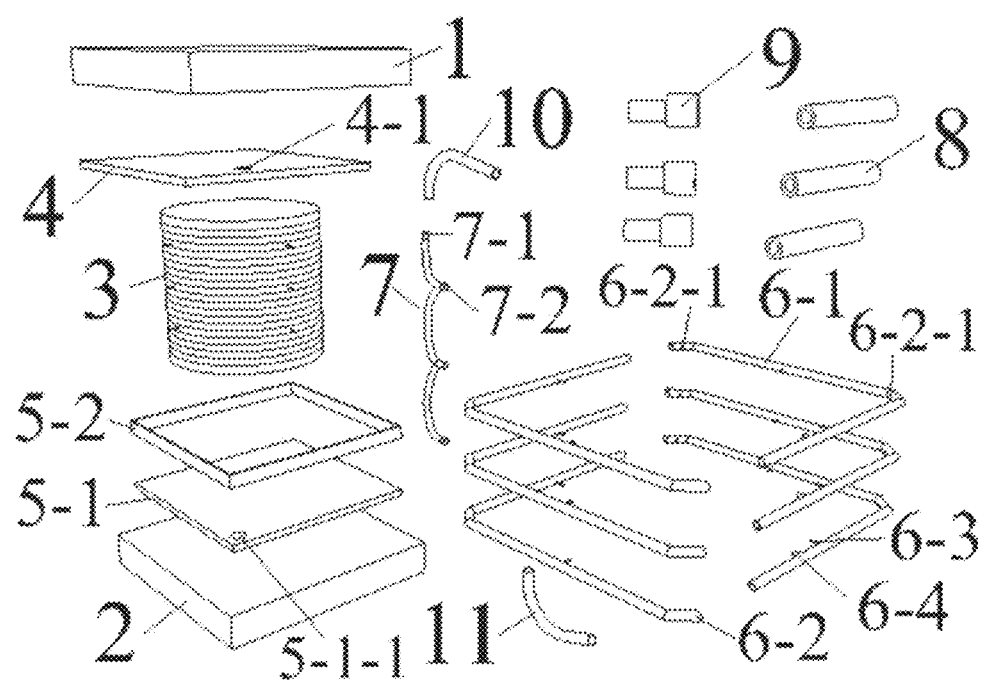
FIG. 2 is an exploded view of the overall structure according to the preferred embodiment of the present invention.
Figure 3:
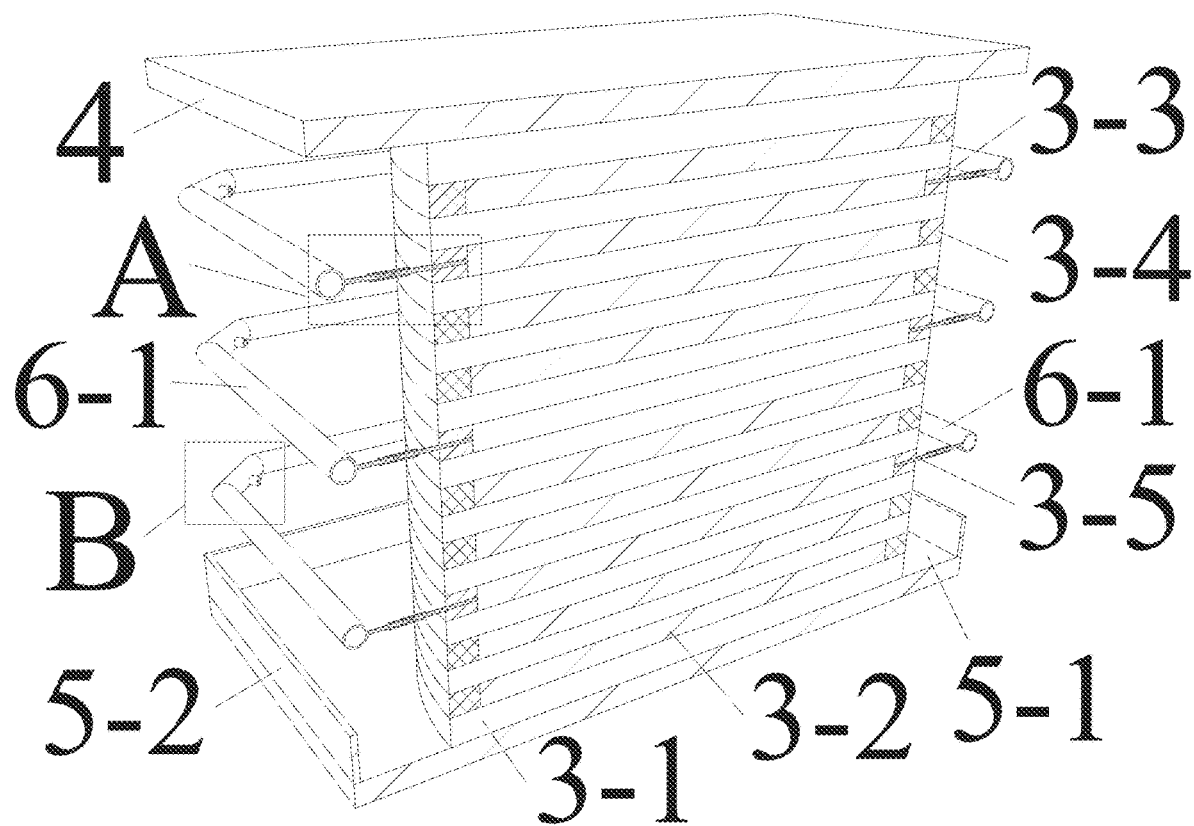
FIG. 3 is a partial cross-sectional view of a functional body according to the preferred embodiment of the present invention.
Figure 4:
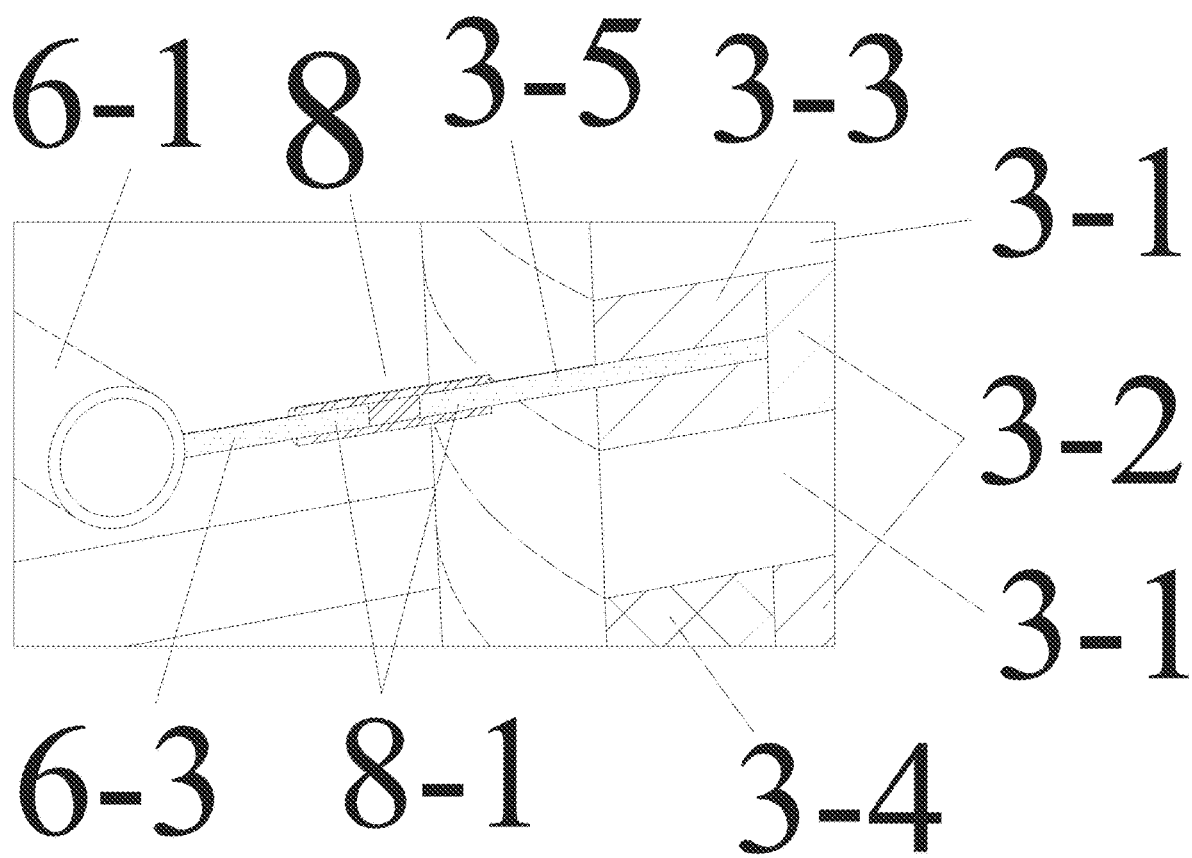
FIG. 4 is an enlarged view of a structure A in FIG. 3.
Figure 5:
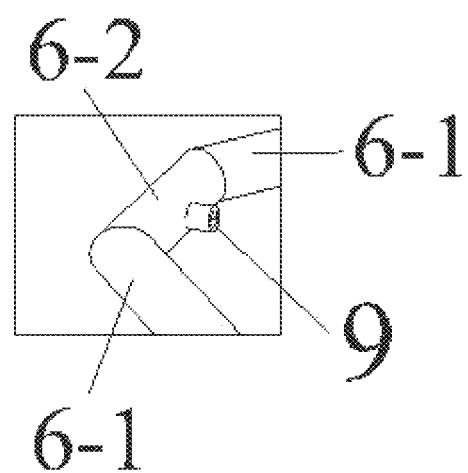
FIG. 5 is an enlarged view of a structure B in FIG. 3.

Referring to FIGS. 1-5 of the drawings, according to a preferred embodiment of the present invention is illustrated, a prefabricated fireproof and active self-cleaning isolation bearing system, comprising: an upper structure 1, a lower structure 2, and a rubber body 3.

Factory prefabrication: an odd number of rubber circular pads 3-1 of the rubber body 3 clamp an even number of circular steel plates 3-2 and the rubber circular pads 3-1 are aligned with circular steel plates 3-2; according to a water spray coverage range in a height direction of the conical nozzle 9, a number of the circular steel plates 3-2 are selected at intervals and four-hole rubber ring pads 3-3 are tightly covered on peripheries of the a number of the circular steel plates 3-2 selected; peripheries of the circular steel plates 3-2 which are not selected are all tightly covered with rubber ring pads 3-4; all four holes of each layer of the four-hole rubber ring pads 3-3 are vertically aligned, perpendicular to an edge line of the bearing lower plate 5-1 and one end of each of the plurality of steel plate reinforcements 3-5 is inserted into all four holes of rubber ring pad 3-3 one by one and welded to the outer surface of round steel plate 3-2, and the other end of the steel plate reinforcements 3-5 extends out of the four-hole rubber ring pad 3-3 with an equal length.

The water receiving tank 5 is composed of a bearing lower plate 5-1 and a rectangular frame 5-2 welded to its periphery, and a circular hole I 5-1-1 is opened at a corner.

The bearing upper plate 4 is connected to a top surface of the rubber body 3, and the bottom surface of the rubber body 3 is connected to the top surface of the bearing lower plate 5-1 by a center aligned manner, and the bearing upper plate 4 is parallel to a side line of the bearing lower plate 5-1.

Each of the plurality of water spray coils 6 are formed by connecting four long pipes 6-1 and four short pipes 6-2 in sequence; four pipe fixing reinforcements 6-3 are respectively connected with each center on the four long pipes 6-1; a nozzle hole 6-2-1 is opened at a center of each of the short pipes 6-2; and a water inlet short pipe 6-4 is provided on one of the four long pipes 6-1 with holes opened thereon.

Adjust so that axes of all the pipe fixing reinforcements 6-3, nozzle holes 6-2-1, and water inlet short pipes 6-4 remain coplanar, and temporarily cut the water spray coils 6 diagonally.

On-site assembly: connecting the upper structure 1 to a top surface of the bearing upper plate 4, and connecting the lower structure 2 to the bottom surface of the bearing lower plate 5-1 in a center aligned manner. Weld one end of the water inlet elbow 10 from above to the circular hole II 4-1 of the bearing upper plate 4, and the other end extends from the upper structure 1.

Weld one end of the water outlet elbow 11 from below to a circular hole I 5-1-1 of the bearing lower plate 5-1, and the other end extends from the lower structure 2; insert the plurality of pipe fixing reinforcements 6-3 of the left half of the water spray coils 6 which are cut into blind holes 8-1 on one side of the insulation sleeve 8 respectively, so that they are pressed against one end face of the middle solid body in the insulation sleeve 8, and insert several blind holes 8-1 on the other side of the insulation sleeve 8 connected to the cut water spray coil 6 into two horizontally adjacent steel plate reinforcements 3-5 extending from the four-hole rubber ring pad 3-3 layer by layer, so that the extended end of each steel plate reinforcements 3-5 of the rubber body 3 is pressed against the other end face of the solid body in the insulation sleeve 8.

Similarly, several pipe fixing reinforcements 6-3 of the right half of the plurality of water spray coils 6 which are cut are respectively inserted into the blind holes 8-1 on one side of the insulation sleeve 8, so that they are pressed against one end face of the solid body in the middle section of the insulation sleeve 8; and several blind holes 8-1 on the other side of several insulation sleeves 8 connected to the water spray coils 6 which are cut are respectively inserted layer by layer into the remaining two horizontally adjacent steel plate reinforcements 3-5 extending from the four-hole rubber ring pad 3-3, so that the extended end of the steel plate reinforcements 3-5 of each rubber body 3 is pressed against the other end face of the solid body in the insulation sleeve 8; then the two cut parts of the water spray coils 6 are welded layer by layer, and the water inlet short pipes 6-4 of the plurality of water spray coils 6 are vertically collinear; conical nozzles 9 with a cone angle of 90° is installed in all of the nozzle holes 6-2-1.

The water inlet 7-1 of the water inlet hose 7 is connected to the circular hole I 4-1 from the bottom surface of the bearing upper plate 4, and the plurality of the water distribution ports 7-2 are connected to all the water inlet short pipes 6-4 in sequence from top to bottom.

The pumping pump, water tower, water reservoir, filter screen, water supply pump and B2 end of the switching valve of the circulation equipment are connected in sequence, the air supply pump is connected to the B1 end of the switching valve, the A end of the switching valve is connected to the extended end of the water inlet elbow 10 of the functional body, and the water inlet end of the pump is connected to the extended end of the water outlet elbow 11 of the functional body.

The length margin of each section of the water inlet hose 7 is greater than the stretching value of the horizontal displacement of the water spray coils 6 under design earthquake action.

The length of the connecting pipe between the circulation equipment and the water inlet elbow 10 or the water outlet elbow 11 meets the stretching value requirement under the earthquake action.

The insulation sleeve 8 is homogeneous throughout, a middle section thereof is a solid body, a longitudinal center axis section is H-shaped, and the two sides of the solid body are blind holes 8-1. The insulation sleeve 8 has the characteristics of high strength, replaceability, and low thermal conductivity, and can be made of mullite corundum.

Embodiment 1

Scenario of a Fire after an Earthquake:
S1: Under the action of earthquake, reliably connecting the water spray coils 6 with the insulation sleeve 8, and moves horizontally back and forth with the circular steel plate 3-2 and the four-hole rubber ring pads 3-3 of the corresponding layer, during which, the water inlet hose 7, the connecting pipes between the circulation equipment and the water inlet elbow 10 or the water outlet elbow 11 remain intact.

S2: After the earthquake, the rubber body 3, reset or slightly offset in the height direction the upper plate 4 of the bearings, the lower plate 5-1 of the bearings, together with the upper structure 1 and the lower structure 2 wherein the horizontal offset is not greater than 50% of the height of the rubber body 3;

S3: When the fire protection system detects or personnel finds a fire, automatically or manually switching the switching valve to the B2 branch, and automatically or manually starting the water supply pump and the drainage pump at the same time;

wherein water is filtered from the water storage tank through the filter screen and pumped to the functional body by the water supply pump through the switching valve B2 branch; in the functional body, the water enters the water inlet hose 7 through the circular hole II 4-1 from the water inlet elbow 10, and is supplied to the plurality of water spray coils 6 by several water distribution ports 7-2 through the water inlet short pipe 6-4; all conical nozzles 9 spray water at the same time, so that the space formed by the vertical surface of the rubber body 3, the bearing upper plate 4 and the bearing lower plate 5-1 are completely covered by the water mist;

transporting water settled in the water receiving tank 5 to the water tower by the drainage pump through the circular hole I 5-1-1 and the water outlet elbow 11 for cooling and then returning to the water reservoir for recycling.

S4: During the cooling process, monitoring and adjusting the opening degree of the switching valve to stabilize the pressure at 0.35 MPa (terminal pressure) so that the space temperature is maintained at not over 110° C.;

S5: When the fire protection system detects or personnel finds that the fire is extinguished, continuing to spray water for 30 minutes, then starting the air supply pump, turning off the water supply pump and switching the switching valve from branch B2 to branch B1, and adjusting the opening degree of the switching valve to stabilize the pressure at 0.15 MPa (terminal pressure);

transporting the air to the functional body by the air supply pump through the branch B2; wherein in the functional body, the air enters the water inlet hose 7 from the water inlet elbow 10 through the circular hole II 4-1, and supplies air to the plurality of water spray coils 6 by several water distribution ports 7-2 through the water inlet short pipe 6-4 at the same time; all the conical nozzles 9 of the plurality of water spray coils 6 spray at the same time, so that the space formed by the vertical surface of the rubber body 3, the bearing upper plate 4 and the water receiving tank 5 are completely filled with fresh air in a room temperature;

S6: After a temperature of the space outside the functional body drops to a room temperature, all the pipes of the functional body, the facade of the rubber body 3, the water receiving tank 5, the space between the upper structure 1 and the lower structure 2 are dried and free of water, turning off the air supply pump and the drainage pump; and at this moment, the protection process for the seismic isolation bearing under the fire after earthquake is completed.

Embodiment 2

Single fire scenario: Executing the steps of S3-S6 mentioned above.

At this point, the protection process for the seismic isolation bearing under a single fire is completed.

Embodiment 3

Rain and Snow Water Corrosion Cleaning and Maintenance:
  S1: After the maintenance period is reached or specific rainy and snowy weather has passed, automatically or manually switching the switching valve to the B2 branch, and are automatically or manually starting the water supply pump and the drainage pump at the same time;
  wherein water is filtered from the water storage tank through the filter screen and pumped to the functional body by the water supply pump through the switching valve B2 branch; in the functional body, water enters the water inlet hose 7 through the circular hole II 4-1 from the water inlet elbow 10, and is supplied to the plurality of water spray coils 6 by several water distribution ports 7-2 through the water inlet short pipe 6-4; all conical nozzles 9 spray water at the same time, so that the space formed by the vertical surface of the rubber body 3, the bearing upper plate 4 and the bearing lower plate 5-1 are completely covered by the water mist;

transporting water settled in the water receiving tank 5 to a wastewater tank by the drainage pump through the circular hole I 5-1-1 and the water outlet elbow 11.

S2: During the process, monitoring and adjusting the opening degree of the switching valve to stabilize the pressure at 0.3 MPa (terminal pressure).

S3: After the cleaning process is completed, starting the air supply pump and turning off the water supply pump at the same time, switching the switching valve from the branch B2 to the branch B1, and adjusting the opening degree of the switching valve to stabilize the pressure at 0.15 MPa (terminal pressure);

wherein air is pumped to the functional body by the air supply pump through the branch B2, in the functional body, the air enters the water inlet hose 7 from the water inlet elbow 10 through the circular hole II 4-1, and is supplied to the plurality of water spray coils 6 by several water distribution ports 7-2 through the water inlet short pipe 6-4 at the same time; all the conical nozzles 9 of the plurality of water spray coils 6 spray air at the same time, so that the space formed by the vertical surface of the rubber body 3, the bearing upper plate 4 and the water receiving tank 5 are completely filled with fresh air in room temperature.

S4: After all the pipes of the functional body, the vertical surface of the rubber body 3, the water receiving tank 5 and other spaces between the upper structure 1 and the lower structure 2 are completely dry, turning off the air supply pump and the drainage pump at the same time.

At this point, the rain and snow water corrosion cleaning and maintenance process is completed.

Embodiment 4

Wind and Sand Etching Protection:

S1: When sandstorm occurs, automatically or manually switching the switching valve to branch B1, and automatically or manually starting the air supply pump at the same time;

wherein the air is pumped to the functional body by the air supply pump through branch B2; in the functional body, the air enters the water inlet hose 7 through the circular hole II 4-1 from the water inlet elbow 10, and is simultaneously supplied to the plurality of water spray coils 6 through several water distribution ports 7-2 via the water inlet short pipes 6-4; all the conical nozzles 9 of the plurality of water spray coils 6 spray air at the same time, so that the space formed by the vertical surface of the rubber body 3, the bearing upper plate 4 and the water receiving tank 5 completely form a positive pressure air protection layer.

S2: During the protection process, monitoring and adjusting the opening degree of the switching valve to stabilize the pressure at 0.25 MPa (terminal pressure).

S3: After the sandstorm ends, turning off the air supply pump.

At this point, a wind and sand etching protection process is completed.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A prefabricated fireproof and active self-cleaning seismic isolation bearing system, comprising:
   an upper structure (1), a lower structure (2), and a rubber body (3) positioned therebetween; and further comprising:
   a functional body and a circulation equipment, wherein the functional body comprises a water receiving tank (5) formed by fixing a rectangular frame (5-2) on a bearing lower plate (5-1), wherein the bearing lower plate (5-1) is mounted on the lower structure (2), wherein a water outlet elbow (11) is provided on the lower structure (2), and the water outlet elbow (11) is connected to the water receiving tank (5);
   wherein a bearing upper plate (4) is mounted under the upper structure (1), a water inlet elbow (10) is provided on the upper structure (1), and the water inlet elbow (10) is connected to the bearing upper plate (4);
   a rubber body (3) is provided between the bearing lower plate (5-1) and the bearing upper plate (4), a plurality of water spray coils (6) are fixed at intervals outside the rubber body (3), the plurality of water spray coils (6) each having a short pipe (6-2), and a conical nozzle (9) is connected on each short pipe (6-2);
   a water inlet hose (7) is connected to the plurality of water spray coils (6) through a plurality of water distribution ports (7-2);
   the water inlet elbow (10) is connected to the plurality of water spray coils (6) through the water inlet hose (7);
   the circulation equipment comprises a drainage pump, a water tower, a water reservoir, a filter screen, a water supply pump and a second end (B2) of a switching valve which are connected in sequence; wherein an air supply pump is connected with a first end (B1) of the switching valve, an opposite end (A) of the switching valve is connected to an outer end of the water inlet elbow (10) of the functional body, and an water inlet end of the drainage pump is connected to an outer end of the water outlet elbow (11) on the functional body,
   wherein the rubber body (3) comprises an odd number of rubber circular pads (3-1) clamping an even number of circular steel plates (3-2) and the rubber circular pads (3-1) are aligned with circular steel plates (3-2); according to a water spray coverage range in a height direction of the conical nozzle (9), a number of the circular steel plates (3-2) are selected at intervals and four-hole layered rubber ring pads (3-3) are tightly covered on peripheries of the selected number of the circular steel plates (3-2); peripheries of the circular steel plates (3-2) which are not selected are all tightly covered with rubber ring pads (3-4); all four holes of each layer of the four-hole rubber ring pads (3-3) are vertically aligned, perpendicular to an edge line of the bearing lower plate (5-1) and all inserted into a respective four steel plate reinforcements (3-5); one end of the respective four steel plate reinforcements (3-5) is connected to an outer surface of the circular steel plate (3-2), and an opposite end of the respective four steel plate reinforcements (3-5) extends out of the four-hole rubber ring pad (3-3) with an equal length.

2. The system as recited in claim 1, wherein each of the plurality of water spray coils (6) are formed by connecting four long pipes (6-1) and four short pipes (6-2) in sequence;

four pipe fixing reinforcements (6-3) are respectively connected with each center on the four long pipes (6-1); a nozzle hole (6-2-1) is opened at a center of each of the short pipes (6-2); and a water inlet short pipe (6-4) is provided on one of the four long pipes (6-1).

3. The system as recited in claim 2, wherein the four pipe fixing reinforcements (6-3) of the plurality of water spray coils (6) are respectively corresponded to the four steel plate reinforcements (3-5) of each layer of the rubber body (3), a thermal insulation sleeve (8) is respectively provided between the pipe fixing reinforcements (6-3) corresponded and the four steel plate reinforcements (3-5) to fix the plurality of water spray coils (6) on the rubber body (3).

4. The system as recited in claim 3, wherein a middle section of the thermal insulation sleeve (8) is a solid body, and both sides of the solid body are provided with blind holes (8-1).

5. A fireproof method for a seismic isolation bearing, wherein steps of a functional body protection process under fire comprising:

providing the system of claim 1;

when a fire is detected, automatically or manually switching the switching valve to a selected branch (B2), and starting the water supply pump and the drainage pump simultaneously, filtering water by the water reservoir through the filter screen, and then passing through the selected branch (B2) of the switching valve, the water inlet elbow (10), the water inlet hose (7), and the plurality of water distribution ports (7-2) to supply water to the plurality of water spray coils (6) simultaneously, all the conical nozzles (9) of the plurality of water spray coils (6) spray water at the same time, in such a manner that a space formed by a vertical surface of the rubber body (3), the bearing upper plate (4) and the water receiving tank (5) are all covered by water;

transporting water settled in the water receiving tank (5) to the water tower via the water outlet elbow (11) by the drainage pump for cooling and then returning to the water reservoir;

during the process, monitoring and adjusting an opening degree of the switching valve to stabilize a pressure at a range of 0.25-1.00 MPa, so as to keep a space temperature within a range of 100-110° C.;

when the fire is extinguished, continuing to spray water for 30 minutes, then starting the air supply pump and turning off the water supply pump and switching the switching valve from the selected branch (B2) to another branch (B1), adjusting the opening degree of the switching valve to stabilize the pressure at a range of 0.10-0.30 MPa;

supplying air by the air supply pump to the plurality of water spray coils (6) through the switching valve via said another branch (B1), the water inlet elbow (10), the water inlet hose (7), and the plurality of water distribution ports (7-2) in sequence, and spraying gas by each of the conical nozzles (9) simultaneously, in such a manner that a space formed by a facade of the rubber body (3), the bearing upper plate (4) and the water receiving tank (5) is completely filled with fresh air under a room temperature; and after a temperature of a space outside the functional body drops to a room temperature, all pipes of the functional body, the facade of the rubber body (3), the water receiving tank (5), a space between the upper structure (1) and the lower structure (2) are dried and free of water, turning off the air supply pump and the drainage pump; at this moment, the protection process for the seismic isolation bearing under a single fire is completed.

* * * * *